April 15, 1930. F. A. TRUESDELL 1,754,780
MULTIPLE WHEEL BRAKE FOR AUTOMOTIVE VEHICLES
Filed Sept. 5, 1922 4 Sheets-Sheet 1
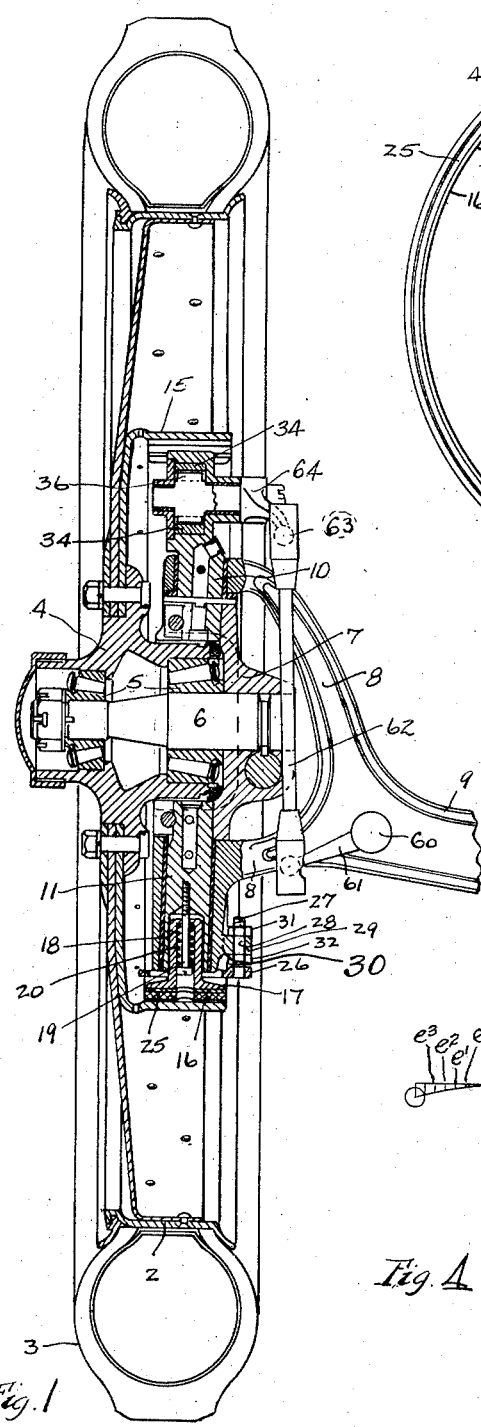
INVENTOR.
Fred A. Truesdell
BY
Fay, Oberlin & Fay
ATTORNEYS

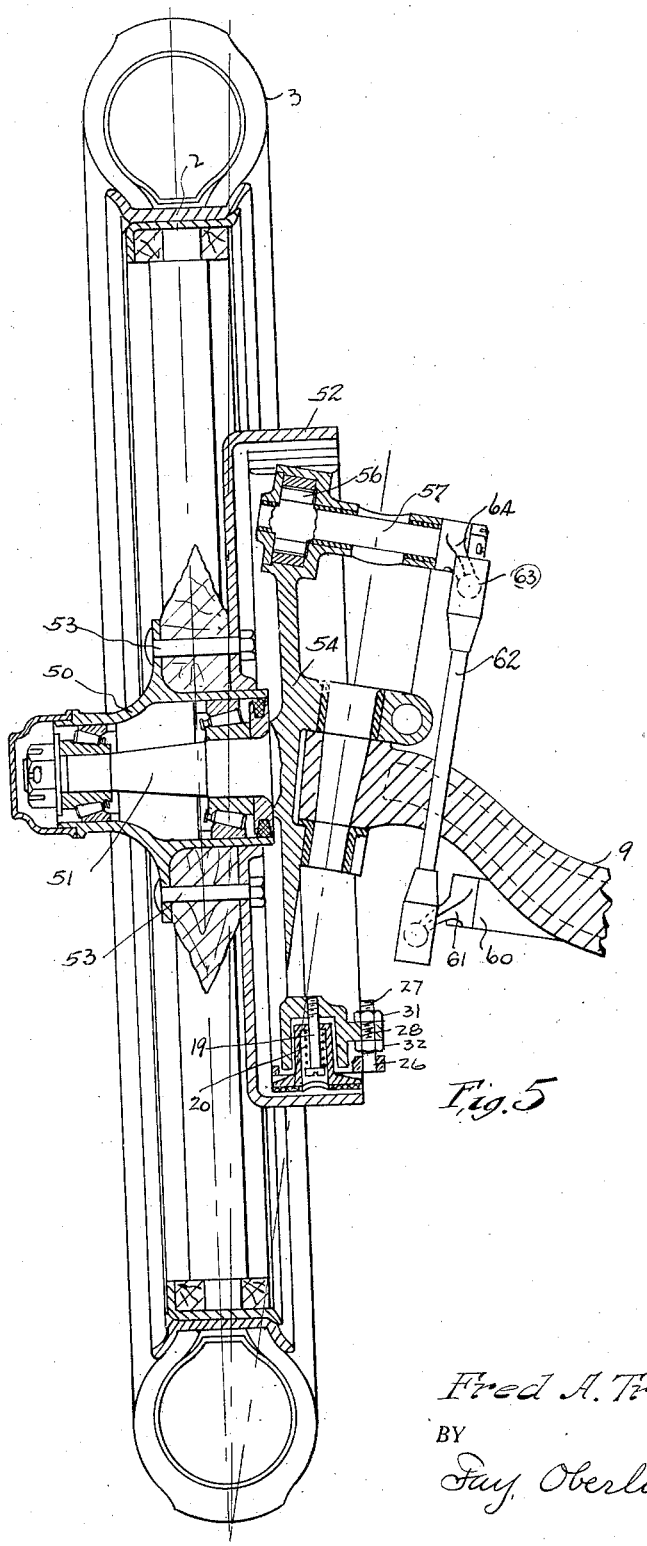

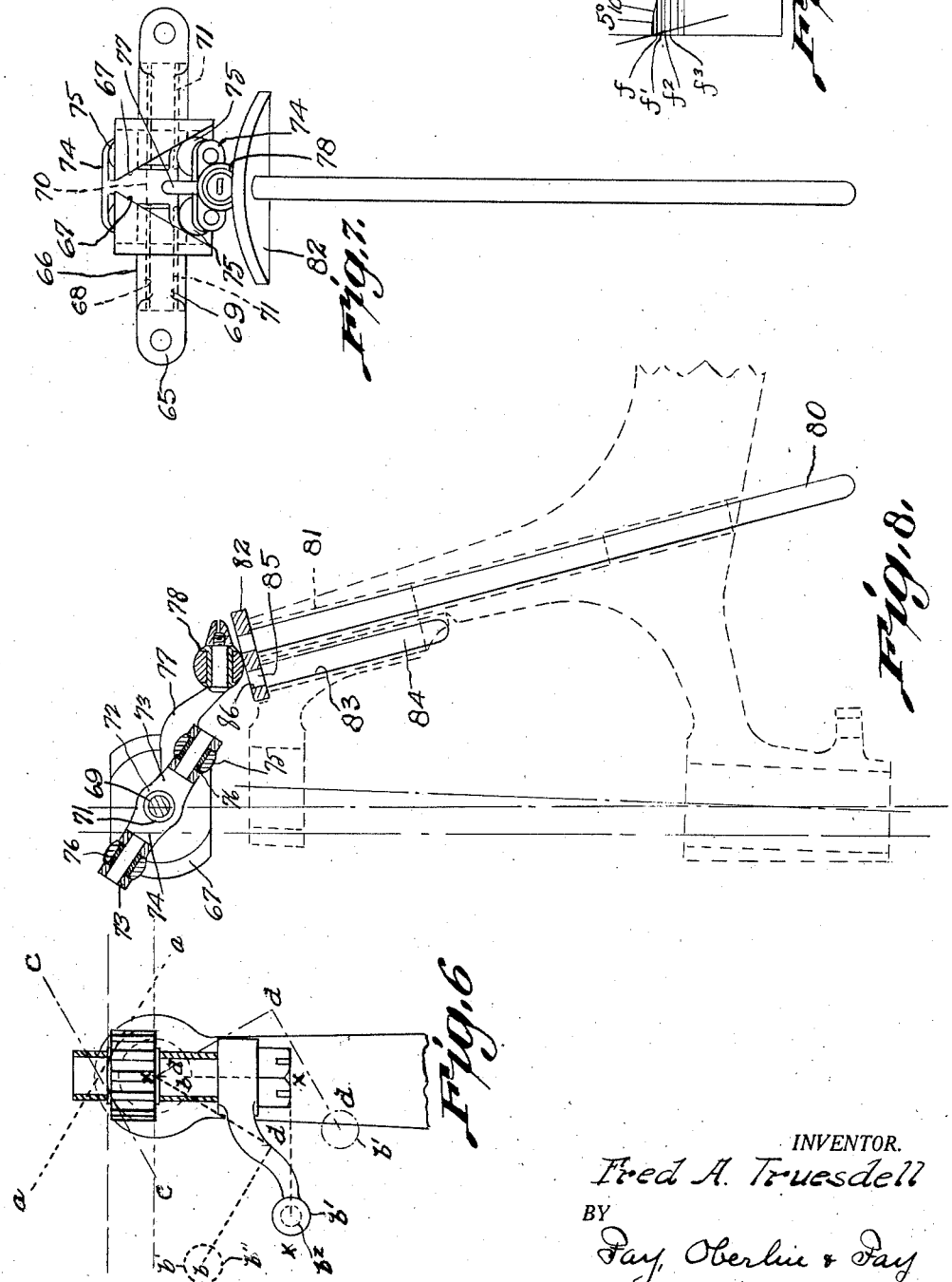

April 15, 1930.   F. A. TRUESDELL   1,754,780
MULTIPLE WHEEL BRAKE FOR AUTOMOTIVE VEHICLES
Filed Sept. 5, 1922   4 Sheets-Sheet 4
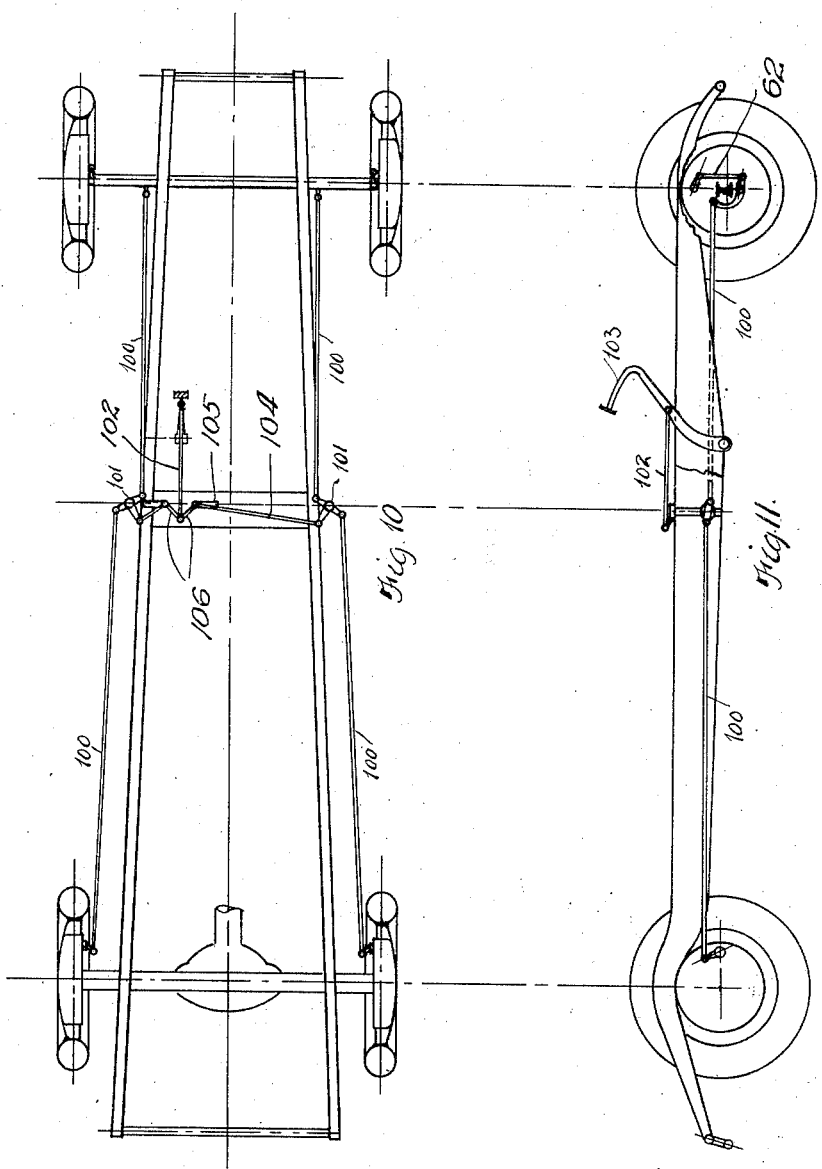
INVENTOR
F. A. Truesdell
By Fay, Oberlin & Fay
ATTORNEYS.

Patented Apr. 15, 1930

1,754,780

UNITED STATES PATENT OFFICE

FRED A. TRUESDELL, OF CLEVELAND, OHIO, ASSIGNOR TO BENDIX BRAKE COMPANY, OF CHICAGO, ILLINOIS, A CORPORATION OF ILLINOIS

MULTIPLE WHEEL BRAKE FOR AUTOMOTIVE VEHICLES

Application filed September 5, 1922. Serial No. 586,134.

The present mechanism relates to safety front wheel brake construction for automobiles and more particularly to the construction of the operating mechanism for such brakes. In the present safety device operating means are provided which are so arranged that the steering of the front wheels releases the brakes, the mechanism being so arranged as to gradually release the braking effect as the wheels are turned until the brake is entirely released just prior to the limit of turning movement of the front wheels.

In four or more wheel brake practice, the brakes are generally actuated in unison and if the brakes are operated when turning a corner the skidding tendency is increased. With the present construction, when turning a corner the steering or front wheel brakes would not be applied or if already applied would be released as the turn was made, such release being gradual and being in proportion to the angle through which the front wheels were turned. This construction also allows the rear or non-steering wheel brakes to be suddenly applied on turns when skidding has started to straighten or throw the car into line whereas the sudden application of steering wheel brakes under the same conditions would increase the tendency to skid or side slip. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a vertical sectional view through a wheel embodying my improved construction; Fig. 2 is an elevational view of the inside of the drum showing the axle in section; Fig. 3 is a section on the line 3—3 of Fig. 2; Fig. 4 is a diagrammatic view showing the relation of the turning movement to the release; Fig. 5 is a view similar to Fig. 1 but showing a modified wheel construction; Fig. 6 is a diagrammatic view showing by line the position of operating parts to illustrate the releasing action. Figs. 7 and 8 are two diagrammatic views showing a side elevation and a front elevation respectively of a modified form of brake actuating means; Fig. 9 is a diagrammatic view showing the release effected by the form shown in Figs. 7 and 8. Fig. 10 is a plan view showing the present device applied to a chassis; and Fig. 11 is a side elevational view of the chassis shown in Fig. 10.

The present brake structure is shown in a single wheel in Fig. 1 in which there is a disk wheel, having the usual rim 2 and tire 3, the disk having a hub 4 mounted on the usual bearings 5 carried by a spindle 6 which is secured to a pivotal steering knuckle 7 carried in the usual yoked ends 8 of an axle 9. The particular wheel and spindle construction here shown in which the pivotal parts 10 and 11 of the steering knuckle are yoked around the spindle and the inner wheel bearing do not form a part of the present invention and are separately covered in my copending application for U. S. Letters Patent, filed September 8, 1922, Serial No. 586,851.

As shown in Fig. 1 a brake drum 15 is attached to the hub and disk so as to rotate therewith in the usual manner. The present brake comprises a split metal band 16 and lining 25 which is preferably supported at it lower point by an anchor bracket 17 which extends into a suitable socket 18 formed in the depending turning pivot 11 of the steering knuckle, the anchor being resiliently supported by means of a threaded bolt 19 which passes through the bracket and is threaded into a tapped hole in the pivot 11, there being a coiled spring 20 mounted between the head of the bolt and the bottom of the bracket which is hollowed out for this purpose. There is sufficient clearance between the anchor post and the socket to allow for movement to let the brake band center and equalize itself.

To hold the brake band 16 and lining 25 outwardly in its correct normal position and to provide for adjustment of this position at the anchor point, a ring 26 is provided which encircles the anchor bracket 17 and presses outwardly against the bracket 17 to limit inward movement of the bracket. This ring is adjustably secured in position, the ring being provided with a threaded stud 27 which extends through a hole 28 in a boss 29, formed on the lower axle yoke 30 and two lock nuts 31 and 32 are provided to hold the stud and thus the ring in any adjusted position.

At the split end of the brake band there are provided two inwardly extending flanges 33 and the brake operating mechanism consists of two racks 34 carried by arms 35 attached to these flanges 33, there being a spur gear 36 mounted between and in engagement with the two racks, this gear 36 being carried upon a pin 37 mounted on the turning knuckle or upper pivot of the wheel in suitable bearings. To hold the brakes in their normally released position, a double yoked arm 38 is carried on the steering knuckle or upper pivot and at each end this arm is provided with a yoke 39 which fits around the lower part of the flange 33 which is slotted as at 40 and the two arms 41 of this yoke are provided with aligned apertures 42 in which are mounted cups 43 having a central aperture 44 to receive a pin 45 and this pin passes through the slot 40 in the brake band flange. In each cup 43 is mounted a coiled spring 46 adapted to force a washer 47 carried on the pin against the flange so as to maintain the brake band in its normal sidewise position. To effect the release of the brake, a coiled spring 48 is mounted between the inner end of the slot 40 in the flange and the cross pin 45 through the cups.

In the structure shown in Fig. 5, the wheel comprises the usual hub 50 and wheel spindle 51 with the usual bearings, but in this case the wheel is shown as of the wooden spoke type and to the hub is attached a brake drum 52 by means of the usual bolts 53, the brake drum being on the inner side of the wheel and extending outwardly beyond the plane of the sides of the wheel. In this construction the steering knuckle 54 which carries the spindle is mounted on an inclined axis and the brake construction is identical with the form shown in Figs. 1 to 3, except that the operating pinion 56 is mounted on a rock shaft 57, which is inclined so as to be at right angles to the pivotal axis of the wheel.

To effect the operation of the brake and to obtain the automatic release, the brake is operated by means of a rock shaft 60 extending through the front axle which carries a ball headed arm 61 pivotally attached to a drag link 62 which at its other end is pivotally attached to the ball 63 of a rocker arm 64 affixed to the pin which carries the operating pinion. This pin 37 is secured to the arm 64 by any suitable means so that the position of the arm 64 and pin 37 and thus the gear 36 may be varied to adjust the normal position of the brake band and lining. This adjustment will not ordinarily be necessary as sufficient movement is obtained to actuate the brake with the lining completely worn out and adjustment may also be made on the usual brake rods but the gear and arm may thus be adjusted if desired.

In the form shown in Fig. 1, it will be seen that the link 62 connecting the two ball ended arms is substantially parallel to the pivotal axis when in the normal position and thus when the rock shaft in the axle is rotated in the direction to engage the brake, the link will be moved upwardly operating the pinion which in turn moves the two racks connected to the ends of the brake band. In the form shown in Fig. 5 the same construction as a whole is employed, but here the link which connects the two ball ended arms is normally inclined so as to be substantially parallel to the pivotal axis in its normal position.

In both of these forms when the brake is operated or when the arms and links are moved to engage the brake band and the lining with the drum, the normal position of the upper shaft carrying the operating pinion and its ball ended arm are best shown in full lines $x$—$x$—$x$ in Fig. 6, in which figure the upper ball connection with the link is indicated by the outer circle $b^1$, while the lower ball connection is indicated by the inner dotted circle $b^2$, these being in the same vertical line or superimposed one above the other. If the wheel is turned outwardly as indicated by the dotted line $a$—$a$ the position of the upper ball ended arm and the shaft which carries the operating pinion are shown by the dotted lines $b$—$d$—$b$ and thus the link assumes an angular position connecting the upper ball $b^1$ with the lower ball $b^2$, which of course, remains in a set position. This angular movement of the drag link 62, which of course, is of fixed length, must necessarily rotate the shaft and thus the operating pinion backwardly, that is, in the direction to release the brake. If the wheel is turned in the opposite direction, that is, so that the center line is as shown by the dot and dash line $c$—$c$, then the pinion shaft and upper ball and the arm assume the position shown by the dot and dash line $d$—$d$—$d$ and the drag link 62 will take the opposite angular position extending from the lower ball $b^2$ to the upper ball $b^1$. This release, due to the change from the parallel relation of the drag link and the pivotal axis, is so set as to completely release the braking mechanism just prior to the maximum turning position of the front wheel and in the forms shown, it has been diagrammatically illustrated in Fig. 4, the angles being the turning angles of the wheel and the vertical lines $e$, $e'$, etc. indicating the actual amount of release in terms of distance. This has been so calculated that in the present wheel and brake construction, the brake would be completely released just prior to the maximum turning movement of the wheels. In Figs. 7 and 8, I have diagrammatically illustrated a modified form similar in general construction to Fig. 1, but with a different form of operating mechanism. To each end flange of the brake band is attached the yoked end 65 of a member 66 having an angular cam face 67. The two ends of member 66 are formed with aligned apertures 68 and a pin 69 having an enlarged central portion 70 extends into such apertures being mounted therein is suitable bushings 71 preferably of the oilless type. Mounted on this pin 69 and preferably rotatable therewith is the cam member 72, the member having two cross pieces 73 and 74 each provided with cam rollers 75 mounted near the ends on suitable bearings 76. This cam member is provided with a rigid operating arm 77 extending toward the axle and provided with a cam roller 78 at its free end. The movement of this arm and roller is accomplished in this form by a shaft or rod 80 extending upwardly through a suitably bushed aperture 81 in the axle, the shaft having a sector shaped head 82 adapted to contact the roller 78 to move the same upwardly to engage the brake. To prevent the rod carrying the sector shaped cam from rotating, the axle is provided with a second hole 83 in which is mounted a stub shaft 84 having its upper end 85 received in a suitable hole 86 in the sector shaped cam.

This cam head 82 is normally contacted by the roller in the center but as the shaft 80 is inclined to the vertical, turning movement of the wheel in either direction will allow the ball to move along the upper surface of the cam about an arc and thus due to the inclination of the surface the ball will move downwardly as well as outwardly gradually releasing the brake in the same manner as in the preferred form. This release has been diagrammatically illustrated in Fig. 9 in which the angles given correspond to the turning angles of the wheel, while the lines $f, f^1, f^2$ etc. indicate the actual amount of release obtained.

In the present construction, there has been provided a steering wheel adapted to a front wheel brake with the brake operating mechanism so arranged that a gradual release of the brake pressure is obtained during the turning movement of the wheel and this has been so set that the brake will be completely released when the wheel has reached its maximum turning angle, or preferably just prior to that point. In most automobile steering mechanism the front wheels turn between 30 and 45 degrees and for any given turning angle, the present device may be arranged to release at the proper moment.

In Figs. 10 and 11, the present device is shown as applied to an automobile chassis, there being brakes on all four wheels which are connected through operating rods 100 to the ends of a three way bell crank lever 101. These bell cranks are connected to links 104 which are adapted to have their inner ends slidably mounted in slots 105 in a cross member of the frame. These inner ends are pivotally attached to short links 106 which are pivotally connected together and to an operating rod 102 attached to the brake pedal 103. The brakes are thus all operated from a single pedal and the links 106 form a floating toggle mechanism which floats back and forth guided in the slots 105 to equalize pressure on the brakes. It is obvious that two toggle mechanisms and two sets of bell cranks may be employed to operate the front and rear brakes from the same pedal and that the operation would not be changed thereby.

The pull on each pair of brakes, that is front and rear, will be equal, but the pull on the front brakes may be different than the pull on the rear brakes and the mechanism is preferably set so as to obtain a slightly greater pull on the rear brakes than on the front brakes.

By the present construction the use of brakes on all wheels may be obtained and yet whenever the car is rounding a curve, the front wheel brakes will be gradually released to reduce the tendency to skid or side slip, which is increased if front wheel brakes are normally employed. When the car is turned sharply, even if the brakes are set, the front wheels will be released and the tendency to skid materially reduced, or acting as a safety device, it will be safe to apply brakes on any or all curves, because if it be a sharp curve, the brakes will only hold on the rear or non-steering wheels, and if the curve be slight, the steering wheel brakes will be applied in proportion to the curve.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a steering wheel brake, the combination of an axle, a steering knuckle, a steering wheel, a brake drum attached to said wheel, a brake for said drum, and brake operating mechanism comprising an operating member mounted on the steering knuckle, a member mounted on said axle, and an intermediate member connected to said other two members and normally having its axis parallel to the axis of the steering knuckle but being adapted to be moved angularly during the turning of said wheel to gradually release the brake in direct proportion to the wheel turning movement.

2. In a steering wheel brake, the combination of an axle, a steering knuckle, a steering wheel, a brake drum attached to said wheel, a brake for said drum, and brake operating mechanism for engaging said brake with said drum, said operating mechanism comprising a rock shaft and arm carried by said steering knuckle and connected to the brake, an operating rock shaft and arm carried by said axle, and a link pivotally connected to said two arms and normally having its axis parallel to the axis of said steering knuckle, said link being adapted to be moved angularly to such axis during turning movement of said wheel to release the brake in direct proportion to the turning movement.

3. In multiple wheel brakes for automotive vehicles the combination of a pair of steering wheels and non-steering wheels, brakes on all of said wheels, and brake actuating mechanism adapted to apply said brakes equally, said steering wheel brake actuating mechanism at the wheel being adapted to proportion the brake action with the turn of the wheel to entirely free the brakes just prior to the maximum wheel turning angle.

4. A braking system for automotive vehicles, comprising brakes on all wheels, the brakes on said steering wheels being adapted to release in proportion to the turning movement from normal of said wheels on their pivotal axes, all of said brakes being self centering and full wrapping in both directions, expanding and releasing mechanism for each of said brakes obtaining a constant amount of expansion and release for a given amount of movement of said mechanism, and other mechanism for applying said brakes equally, said last named mechanism having sufficient leverage to overcome the wrapping action of said brakes.

5. A braking system for automotive vehicles, comprising brakes on all wheels, the brakes on said steering wheels being adapted to release in direct proportion to the turning movement from normal of said wheels on their pivotal axes, all of said brakes being self centering and full wrapping in both directions, expanding and releasing mechanism for each of said brakes obtaining a constant amount of expansion and release for a given amount of movement of said mechanism at the expanding point and brake operating mechanism including floating toggles for applying and releasing said brakes equally, said operating mechanism being of sufficient leverage to overcome the reaction of the brake wrapping against the expanding mechanism.

6. A braking system for automotive vehicles, comprising brakes on steering wheels and non-steering wheels, said steering wheel brakes being adapted to release in direct proportion to the turning movement of said wheels around their pivots, all of said brakes being of the internal band type having anchor clearance to allow self centering and full wrapping in both directions, an expanding and releasing device for said brake adapted to cause a constant amount of expansion and release of said bands for a given amount of application, and brake operating mechanism including a floating toggle having sufficient leverage to overcome the wrapping action of the brake against said expanding mechanism.

Signed by me this 2nd day of September, 1922.

FRED A. TRUESDELL.